US011260324B2

(12) United States Patent
Bussinelli

(10) Patent No.: US 11,260,324 B2
(45) Date of Patent: Mar. 1, 2022

(54) APPARATUS FOR FILTERING LIQUIDS

(71) Applicant: Filippo Bussinelli, Zevio (IT)

(72) Inventor: Filippo Bussinelli, Zevio (IT)

(73) Assignee: Filippo Bussinelli, Zevio (IT)

( * ) Notice: Subject to any disclaimer, the term of this patent is extended or adjusted under 35 U.S.C. 154(b) by 0 days.

(21) Appl. No.: 16/647,078

(22) PCT Filed: Sep. 7, 2018

(86) PCT No.: PCT/IB2018/056822
§ 371 (c)(1),
(2) Date: Mar. 13, 2020

(87) PCT Pub. No.: WO2019/053569
PCT Pub. Date: Mar. 21, 2019

(65) Prior Publication Data
US 2020/0206654 A1     Jul. 2, 2020

(30) Foreign Application Priority Data

Sep. 15, 2017 (IT) .............................. 2017000103653

(51) Int. Cl.
*B01D 24/08*     (2006.01)
*B01D 24/46*     (2006.01)
(Continued)

(52) U.S. Cl.
CPC ........... *B01D 24/008* (2013.01); *B01D 23/06* (2013.01); *B01D 23/16* (2013.01); *B01D 24/4631* (2013.01); *C02F 2003/001* (2013.01)

(58) Field of Classification Search
CPC ...... B01D 24/008; B01D 23/06; B01D 23/16; B01D 24/08; B01D 24/14; B01D 24/40;
(Continued)

(56) References Cited

U.S. PATENT DOCUMENTS

| 4,643,836 A | * | 2/1987 | Schmid ................. B01D 24/08 |
| | | | 210/795 |
| 2007/0158278 A1 | * | 7/2007 | Deschenes ........... B01D 24/105 |
| | | | 210/793 |

FOREIGN PATENT DOCUMENTS

| DE | 1109144 B | * | 6/1961 | ........ B01D 24/4636 |
| GB | 1294880 A | * | 11/1972 | .......... B01D 24/008 |
| WO | WO-9744111 A1 | * | 11/1997 | .......... B01D 35/153 |

* cited by examiner

*Primary Examiner* — Matthew O Savage
(74) *Attorney, Agent, or Firm* — Maschoff Brennan; Brent A. Johnson

(57) ABSTRACT

The present invention relates to a filtering apparatus (1) for the filtration of liquids, in particular water. It comprises, inside a container (11), a first chamber (50) intended to receive liquid to be filtered, a second chamber (54) intended to receive filtered liquid, a first porous wall (51) and a second porous wall (53) which delimit a filtration chamber (40) between them. The first porous wall (51) divides the first chamber (50) from the filtration chamber (40) and the second porous wall (53) divides the second chamber (54) from the filtration chamber (40), so that the filtration chamber (40) is interposed between the first chamber (50) and the second chamber (54). A granular filter material (4) is housed in the filtration chamber (40) and is enclosed between the first porous wall (51) and the second porous wall (53). The first chamber (50) receives the liquid to be filtered at a first height (H1) which is at a higher altitude than the second height (H2) at which the second chamber (54) discharges the filtered liquid. The first chamber (50), the filtration chamber (40) and the second chamber (54) are flanked to each other and, in a section between the first height (H1) and the second height (H2), are all intersected by a plurality of horizontal planes (P) parallel to each other. In use, the liquid to be filtered passes from the first chamber (50) to the second (Continued)

chamber (54) substantially by gravity and through the filtration chamber (40) with a flow path having a horizontal component.

10 Claims, 9 Drawing Sheets

(51) Int. Cl.
*C02F 3/00* (2006.01)
*B01D 24/00* (2006.01)
*B01D 29/31* (2006.01)

(58) Field of Classification Search
CPC .......... B01D 24/4636; B01D 24/4631; Y02W 10/10; C02F 2303/16; C02F 1/281; C02F 3/06; C02F 2003/001; C02F 2201/003
USPC ........................................ 210/266, 279, 289
See application file for complete search history.

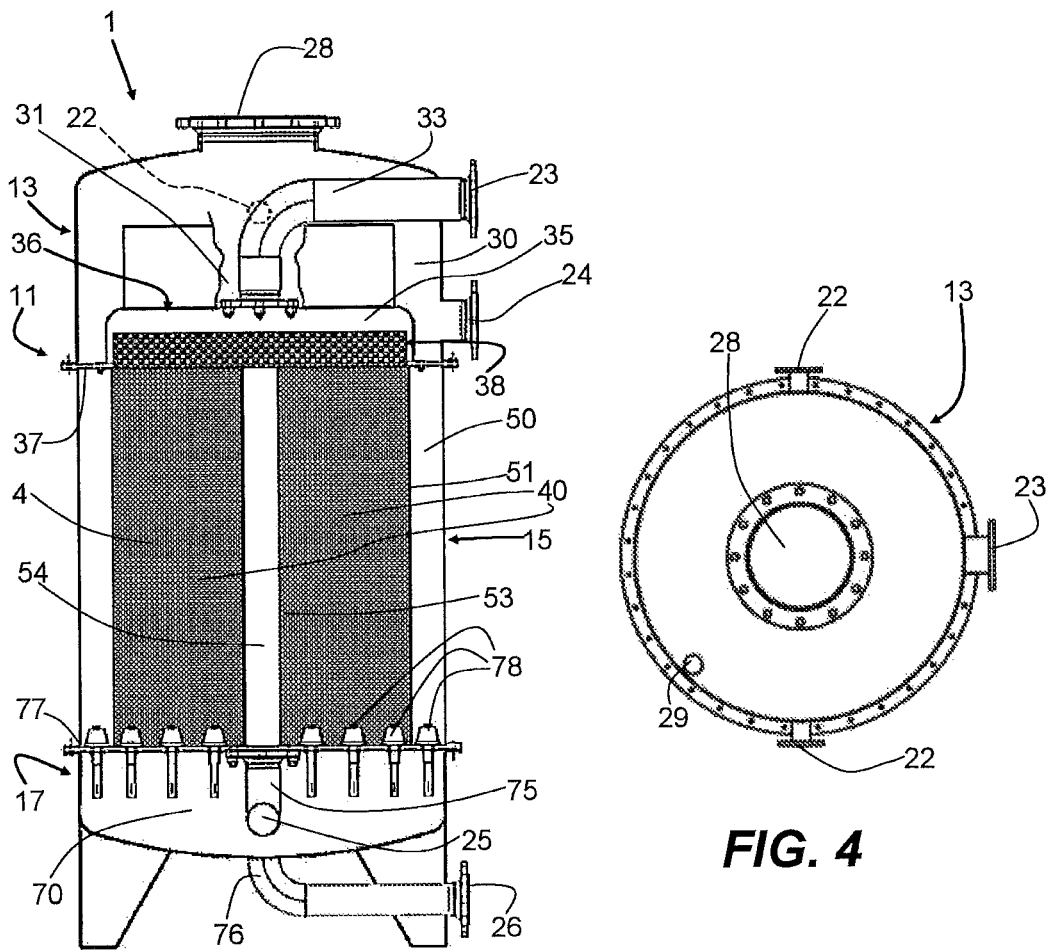
FIG. 3
FIG. 4
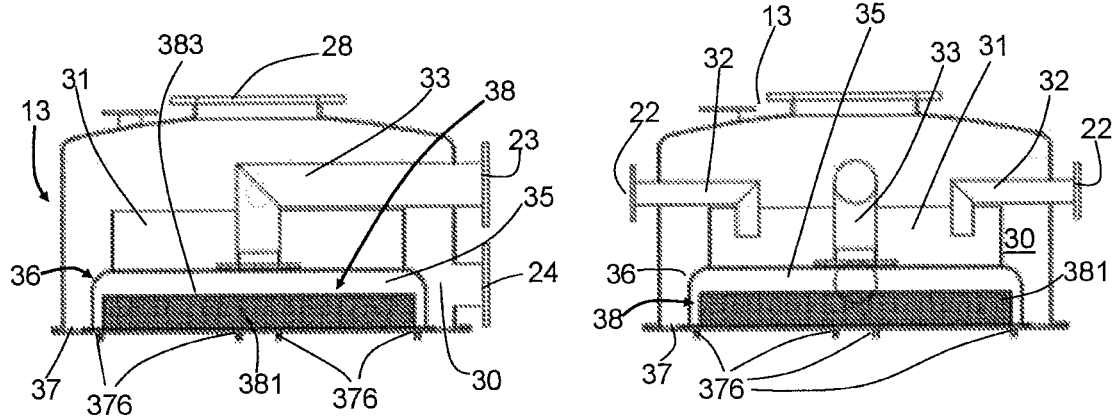
FIG. 5
FIG. 6

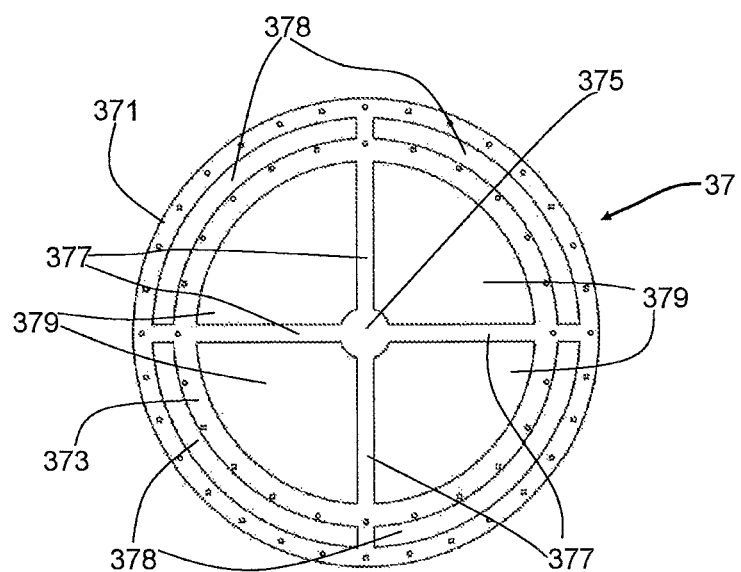
FIG. 7
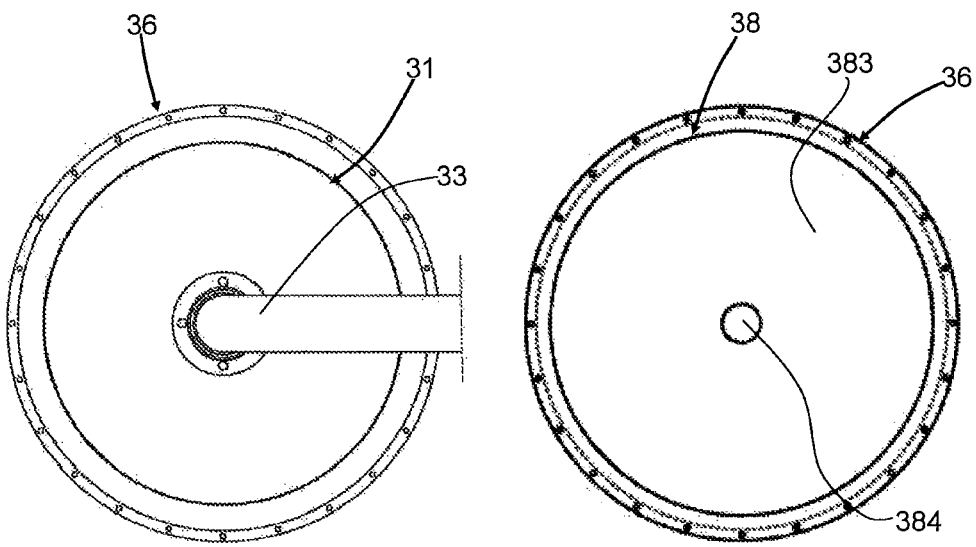
FIG. 8          FIG. 9

APPARATUS FOR FILTERING LIQUIDS

CROSS-REFERENCE TO RELATED APPLICATIONS

This is a 35 U.S.C. 371 National Stage Patent Application of International Application No. PCT/IB2018/056822, filed Sep. 7, 2018, which claims priority to Italian application 2017000103653, filed Sep. 15, 2017, each of which is hereby incorporated by reference in its entirety.

The present invention relates generally to the field of water and fluids treatment in general. In particular, the present invention relates to a filtering apparatus for liquids filtration, with particular application in water filtration.

Many types of filtering equipment are already known. Among them, reference is made specifically to gravity filters, wherein the water to be treated flows over a sand bed filter: the water to be processed passes through the sand bed in a vertical direction and leaves the impurities to be removed in it. The treated water is collected under the sand bed.

Periodically it is necessary to regenerate the sand bed to remove accumulated impurities.

The gravity filters are effective because, thanks to the slow speed of the filter bed passing, the impurities have time to be stopped by the filter bed.

However, they present a drawback related to the footprint. In fact, the filtering surface develops horizontally and thus the plan footprint is proportional to the water flow rate to be filtered.

Furthermore, when the water has occupied the whole region above the filter bed, it exerts a pressure which compresses the filter bed and reduces its empty/full ratio. Since the water speed through the filter bed is inversely proportional to the empty/full ratio, empty space reduction forces the water to pass at a higher speed. This can result in a filtration efficiency reduction.

Furthermore, the regeneration step of the filter bed, which usually consists in a backwashing of the sand bed, can be inconvenient and difficult to manage.

In this context, the technical task underlying the present invention is to provide a filtering apparatus for water or other liquids filtration which allows to overcome, or at least reduce, the aforementioned drawbacks or at least offers an alternative solution to the currently known filtering apparatuses.

The technical task and the purposes indicated are substantially achieved by a filtering apparatus according to claim 1. Particular embodiments of the object of the present invention are defined in the corresponding dependent claims.

A filtering apparatus according to the present invention is intended to be used for liquids filtration, in particular water and in specific clear waters. For example, it can be used in the following sectors: filtration of clear waters taken from groundwater or wells; filtration of clear waters for purification purposes; filtration of clear waters for industrial use; filtration of clear waters from industrial processes; filtration of clarified waste waters from industrial processes; filtration of clarified drain waters from industries (tanneries, cellars, slaughterhouses, etc.); filtration of clarified waste waters from chemical baths; filtration of clear waters with complex organic pollutants (for example perfluorinated alkyl substances—PFAS); filtration of clear waters for swimming pools; filtration of clear waste waters. The filtering apparatus according to the present invention can be used for the filtration of other liquids, such as liquids for industrial applications. The filtration can also take place with the use of microorganisms in the filter bed of the apparatus.

According to one aspect of the present invention, the filtering apparatus comprises a first chamber is intended to receive liquid to be filtered at the inlet, a second chamber is intended to receive filtered liquid and to discharge it towards an outlet, a first porous wall and a second porous wall which delimit a filtration chamber between them. The first porous wall divides the first chamber from the filtration chamber, while the second porous wall divides the second chamber from the filtration chamber. A granular filter material is housed in the filtration chamber and is enclosed between the first porous wall and the second porous wall, forming a filter bed.

The inlet of liquid to be filtered in the first chamber is at a first height, while the filtered liquid outlet from the second chamber is at a second height; the first height is at a higher altitude than the second height. Moreover, the first chamber, the filtration chamber and the second chamber are laterally flanked to each other and, in a section between the first height and the second height, are all intersected by a plurality of horizontal planes parallel to each other, i.e. each of these horizontal planes intersects the three chambers (in addition to the two porous walls which divide them).

Due to this arrangement of the chambers, the liquid to be filtered can pass from the first chamber to the second chamber substantially by gravity and passing through the filtration chamber with a flow path which has a horizontal component. This is significantly different from gravity filters or pressure filters that are currently known, wherein the liquid flow through the filter bed is vertical.

If necessary, a pump downstream of the second chamber can suck up the filtered liquid which, after passing through the first chamber and the filtration chamber, arrives purified in the second chamber. In this case the pump can help the water flow through the filter bed, adding the depression created by the pump to the gravity force due to the difference in altitude between the inlet in the first chamber and the outlet from the second chamber.

The object of the present invention, essentially, is a gravity filter or a forced gravity filter.

The object of the present invention is useful to provide a filtering apparatus which has a low emptying speed and reduced load losses, with values comparable to those of the currently known gravity filters, but wherein the filter bed is not significantly compressed. As a matter of fact, the liquid flow between the flanked chambers has a horizontal component and the liquid to be filtered does not form a leaf over the filter bed.

Furthermore, it is possible to develop the filtering surface in height instead of in plan, greatly reducing the footprint of the apparatus compared to known apparatuses, with the same filtering surface.

Specifically, said chambers are within a container which defines a closed volume.

In one embodiment, the filtration chamber has an annular shape, one between the first chamber and the second chamber has an annular shape which surrounds the filtration chamber from outside, the other between the first chamber and the second chamber has a tubular shape which is surrounded by the filtration chamber. In this embodiment, the flow path from the first chamber to the second chamber is substantially radial compared to the tubular shaped chamber. Essentially, it is a gravity filter with radial flow. This configuration is useful for its constructive and mounting simplicity.

In particular, the first chamber surrounds the filtration chamber from outside and the second chamber is surrounded by the filtration chamber. The flow of the liquid to be filtered is therefore radial from the periphery of the filtration chamber towards the inside. In this configuration, the surface of the first porous wall is very large compared to the second porous wall. This is useful for a greater filtration efficiency.

In one embodiment, the first porous wall comprises a filter mesh layer and is intended to act as a pre-filter to retain at least a part of the impurities carried by the liquid to be filtered upstream of the filtration chamber. This is useful to increase the filtration efficiency at the same sizing of the filtration chamber, to reduce the granular filter material fouling and therefore to reduce the washes frequency of the latter.

According to another aspect of the present invention, the filtering apparatus comprises a washing system to wash the granular filter material by means of a washing liquid flow (in particular, wash water) which is forced through the filtration chamber. The granular filter material washing is, in practice, a regeneration of the filter bed. In one embodiment, the washing liquid flow travels through the filtration chamber with a substantially vertical path. The washing liquid path within the filtration chamber is transverse compared to the path of the liquid to be filtered.

This is useful to achieve a more effective washing compared to the known equipment, with a washing liquid consumption and washing time reduction. Furthermore, this allows the washing liquid circuits to be kept separate from the circuits used for the liquid to be filtered, avoiding contamination of the latter. Even more particularly, it is possible to avoid the need for a specific pump for the washing circuits and it is possible to use a single pump which, alternatively, discharges the filtered liquid from the second chamber or supplies the washing liquid which, due to the thrust produced from the same pump, is introduced under pressure into the filtration chamber and removes the impurities retained in the previous filtration step.

In one embodiment, the filtration apparatus further comprises an injector for metering microorganisms in the filtration chamber. The microorganisms are intended to colonize the granular filter material. In a modality of use the microorganisms are intended to generate a biofilm in the filtration chamber, allowing to purify the liquid from specific pollutants which are captured by the biofilm and which are assimilated by the microorganisms. In another mode of use, the granular filter material colonization by specific microorganisms appropriately injected can be used to enrich the filtered liquid to the advantage of specific processes, such as microorganisms which give active ingredients of the mother yeast to the water and shorten leavening pizza, bread or other products times, or to slow down the fermentation of musts during filtration without the aid of chemical additives.

Further characteristics and the advantages of the present invention will become more evident from the detailed description of an exemplary but not exclusive embodiment of a filtering apparatus. Reference will be made to the following drawings wherein:

FIG. 3 shows a second side sectional view of the apparatus of FIG. 1;

FIG. 4 shows a top view of the apparatus of FIG. 1;

FIGS. 5 and 6 show two side sectional views of a top part of the apparatus of FIG. 1, said top part being detached from the rest of the apparatus;

FIGS. 7, 8 and 9 show top views of respective components of the top part of FIG. 6;

Figure 1:
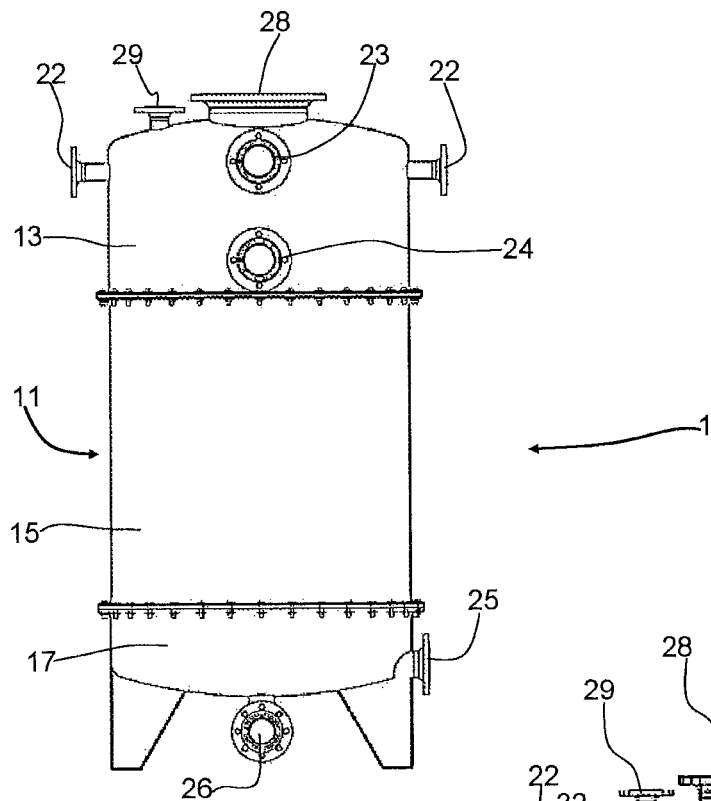
FIG. 1 shows a schematic side view of a filtering apparatus made according to the present invention.
Figure 23:
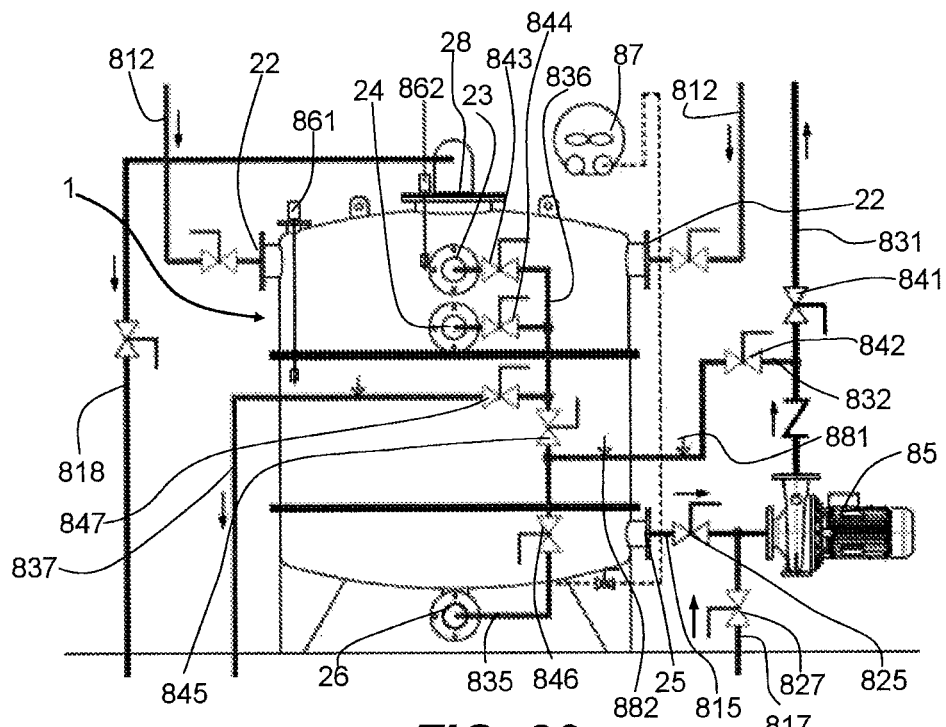
Figures 24, 25:
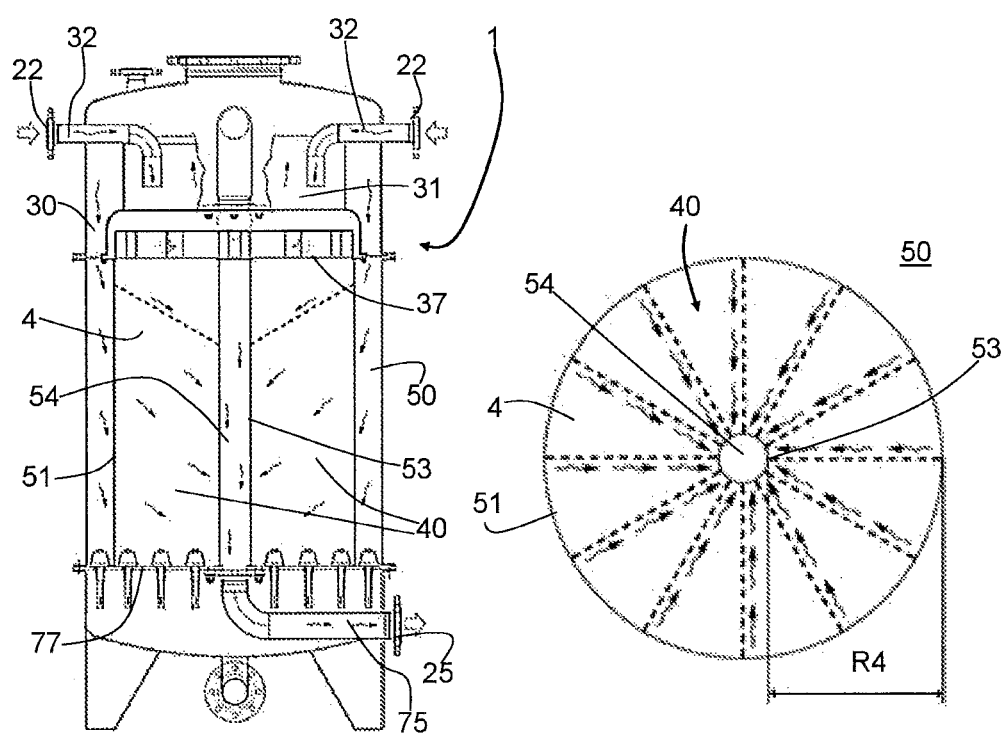
Figure 26:
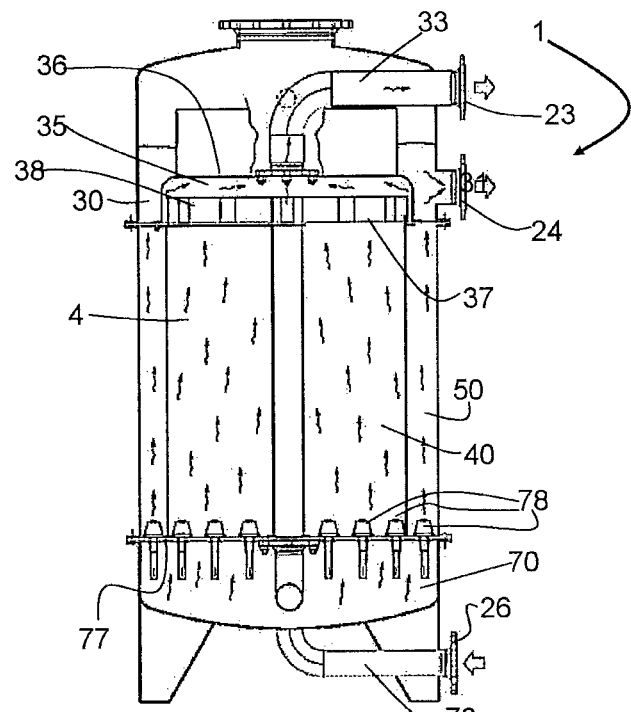
Figure 27:
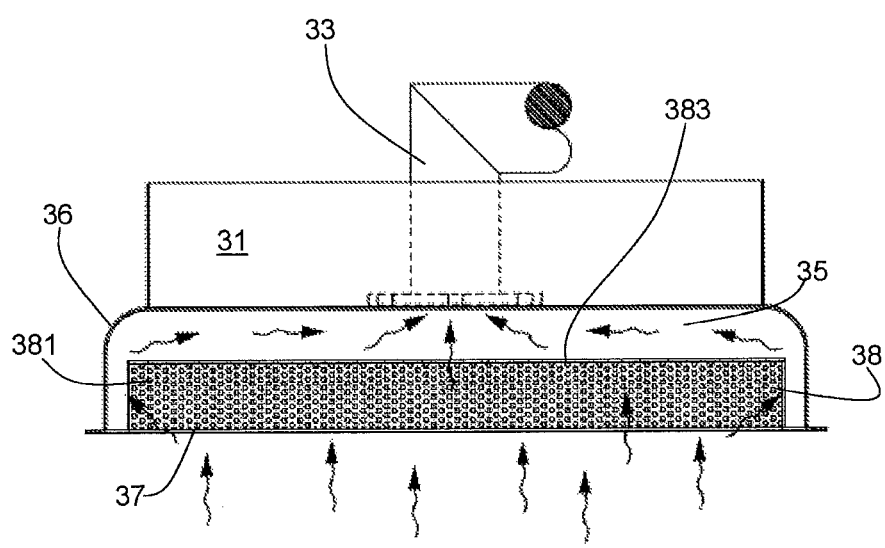

FIG. 23 schematically shows the apparatus of FIG. 1 with further components and hydraulic connections;

FIG. 24 and FIG. 25 schematically show a filtration step for the apparatus of FIG. 1;

FIG. 26 and FIG. 27 schematically show a washing step of the apparatus of FIG. 1.

With reference to the aforementioned figures, a filtering apparatus according to the present invention is generally indicated with the reference number 1. The filtering apparatus 1 is intended to be used for liquids filtration. In particular, the filtering apparatus 1 is intended to be used for water filtration, specifically for clear waters filtration. In the following reference will therefore be made to water filtration, being however understood that what is described also applies to other liquids filtration such as liquids for industrial applications. Regarding the filter bed washing, in the following reference will be made to a washing liquid which is specifically water, however other liquids could be used.

The filtering apparatus 1 comprises a container 11 which encloses a closed inner volume in which filtration takes place. The container 11 is essentially a tank or container in which there is a granular filter material 4 and which has inlets and outlets for the water to be filtered, for the filtered water and for the washing water. The container 11 is made, for example, of metal sheet or fiberglass. In the illustrated embodiment, the container 11 has a substantially cylindrical shape and is positioned with a central vertical axis.

In particular, the container 11 is divided into three parts which are joined together, for example by means of bolted flange joints: a top cover 13; a central body 15; a bottom 17.

The top cover 13, which is shown in greater detail in FIGS. 4 to 6, has a substantially inverted cup shape. The top cover 13 has at least one inlet 22 for the water to be filtered (in particular two inlets 22) and encloses an inner volume wherein there is also a still basin 31. The inlets 22 are connected to respective tubes 32 which feed the still basin 31, which has the function of receiving the incoming water and attenuating its speed. Water through the inlets 22 can flow by fall or push by a pump.

As shown in the figures, the still basin 31 is substantially at the centre of the volume enclosed by the top cover 13 and is spaced from the side wall of the latter, whereby the still basin 31 is surrounded by an upper annular chamber 30.

The top cover 13 also has at least one washing water outlet. In particular there are a first outlet 23 and a second outlet 24.

The top cover 13 may comprise further accesses to the inner volume, such as an overflow gate 28 and a level probe gate 29.

In the volume enclosed by the top cover 13 there is a chamber 35 for collecting the washing water. In particular, the collection chamber 35 is positioned under the still basin 31.

The first outlet 23 for the washing water is connected to the collection chamber 35 by means of a tube 33 which ends into the collection chamber 35 through the bottom of the still basin 31. The second outlet 24 for the washing water is connected to the upper annular chamber 30 and opens on the side wall of the top cover 13.

In particular, the collection chamber 35 is delimited at the top and the side by a cap-shaped element 36, above which there is the still basin 31. Also, the cap-shaped element 36 is spaced perimetrically from the side wall of the top cover 13 and the upper annular chamber 30 also surrounds the cap-shaped element 36.

The cap-shaped element 36 is supported by a first plate 37 whose perimetral edge 371 is fixed between the flange joints connecting the top cover 13 and the central body 15. The first plate 37 has an inner ring 373 on which the cap-shaped element 36 is fixed; the first plate 37 also has a central disc 375 and radial ribs 377 which structurally connect together the central disc 375, the inner ring 373 and the outer ring forming the perimetral edge 371. The first plate 37 has large openings for water transition. First transition openings 378 are defined between the perimetral edge 371 and the inner ring 373 and are positioned under the upper annular chamber 30; second transition openings 379 are defined between the inner ring 373 and the central disc 375 and are positioned under the cap-shaped element 36.

In the collection chamber 35 there is also a retaining element 38 which is also fixed to the inner ring 373 of the first plate 37 and is above the second transition openings 379. The retaining element 38 comprises, for example, a perforated perimetral sheet 381, which is suitable for the transition of the washing water and for retaining the filter material particles 4 as will be clearer in the following, and a top part 383 which for example is a non-perforated sheet. The retaining element 38 is spaced from the cap-shaped element 36 perimetrically and at the top, to free a passage for the washing water towards the tube 33.

In the embodiment shown in the figures, the top part 383 of the retaining element 38 is a metal sheet with a through hole 384 (for example in a central position), which has the purpose of limiting the pressure that is established in the washing step. This hole 384 may not be necessary for a filtering apparatus 1 having small sizes, while it may be useful for a filtering apparatus 1 having a large sizes and large flow rate. For example, the hole 384 has a diameter between 50 mm and 150 mm, to be sized according to the flow rate of the washing water.

The central body 15 has a substantially tubular shape, in particular cylindrical, with two annular fixing flanges at the ends which, with appropriate bolts, allow the central body 15 to be fixed to the respective flanges of the top cover 13 and the bottom 17.

The central body 15 encloses an inner volume wherein there is a filtration chamber 40 in which a granular filter material 4 is housed, i.e. a granular material suitable for being passed through by water. The granular filter material 4 constitutes a filter bed which in particular completely occupies the filtration chamber 40.

The granular filter material 4 is for example sand (in particular quartz sand) or other types of granular materials depending on the filtration needs. In one embodiment the granular filter material 4 is quartz sand with a minimum granulometry of 0.075, arranged with a single layer or multilayer system (i.e. with only one or more granulometry). In other embodiments, the granular filter material 4 is or comprises other materials such as glass, pyrolusite, vegetable carbon, diatomaceous flour, zeolite.

The granular filter material 4 is enclosed between an outer porous wall 51 and an inner porous wall 53, which are substantially tubular-shaped walls and are both in the volume delimited by the central body 15.

The outer porous wall 51 has the top perimeter which is at the inner ring 373 of the first plate 37. The outer porous wall 51 is spaced from the tubular wall of the central body 15 and is surrounded by an annular chamber 50 (or lower annular chamber), which communicates with the upper annular chamber 30 above the first plate 37 by means of the first transition openings 378 of the latter.

The inner porous wall 53 has the top perimeter which is at the central disc 375 of the first plate 37. The inner porous wall 53 delimits an inner chamber 54 which is under the central disk 375. Both the porous walls 51, 53 are enclosed between the first plate 37, at their top, and a second plate 77, at their bottom.

In particular, the outer porous wall 51 and the inner porous wall 53 are cylindrical walls coaxial with each other, as well as coaxial with the tubular wall of the central body 15. Specifically, the axis of cylindrical porous walls is a substantially vertical axis. Furthermore, the inner chamber 54 is a substantially tubular chamber extending axially to the centre of the central body 15.

As said, the granular filter material 4 is in the space between the two porous walls 51, 53, which have porosity such as to let the water pass and to retain the filter material 4 granules. In the illustrated embodiment, the water to be filtered passes through the granular filter material 4 from the annular chamber 50 to the inner chamber 54.

In a first embodiment illustrated in FIGS. 11, 12, 15 and 16, each porous wall 51, 53 comprises two layers 511, 512 of perforated sheet (for example with square holes with 8-10 mm side) between which is interposed a layer 513 of filter mesh (for example, the mesh has a light between 100 and 350 microns, depending on the type of fluid to be treated). In particular, both the perforated sheet layers 511, 512 and the filter mesh layer 513 are made of stainless steel (for example AISI-316). For example, the perforated sheet layers 511, 512 have a 1 mm thickness and the filter mesh layer 513 has, for example, a 0.5 mm thickness.

Each porous wall 51, 53 further comprises an upper band 514 and a lower band 515, both of solid sheet, for example with 2.5 mm thickness. For example, the upper band 514 has a 10 mm height and the lower band 515 has a 77 mm height; in another example, both bands 514, 515 have a 50 mm height.

Figure 12:
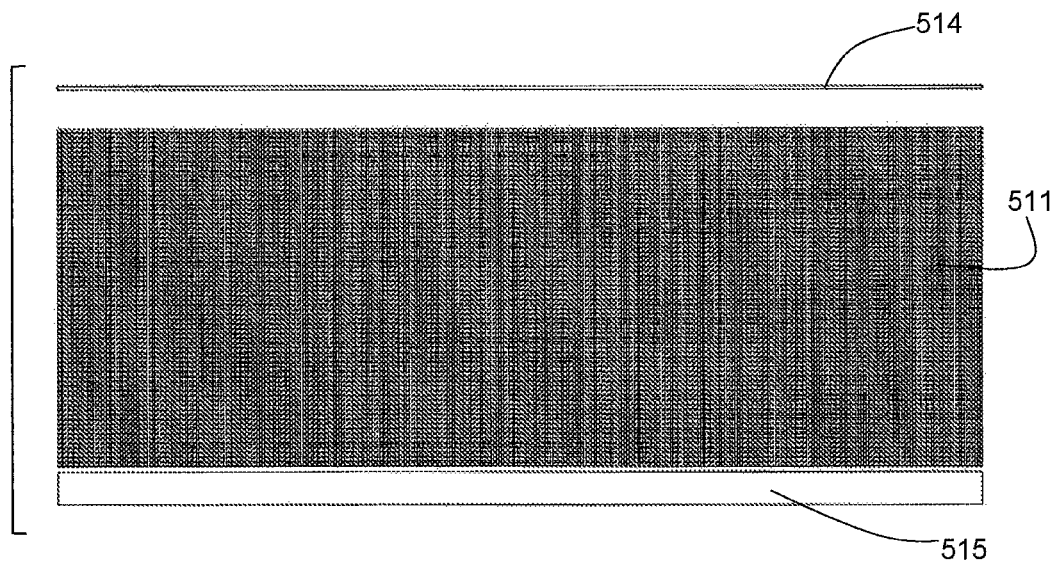
FIG. 12 shows an exploded view of a component of the central part of FIG. 10.

FIG. 12 shows an unmounted porous wall 51, 53, wherein the bands 514, 515 are detached from the filtering layers and the parts are carried out on a plane. To make the respective porous wall 51, 53, the parts are welded together; the obtained flat assembly is folded into a tube and the flaps are welded together to maintain the tubular shape. The upper and lower bands 514, 515 are used for the porous wall mounting 51, 53 in the filtering apparatus 1 and are intended to be received in annular seats 376, 776 with a U-section made on the first plate 37 and on the second plate 77.

Figure 20:
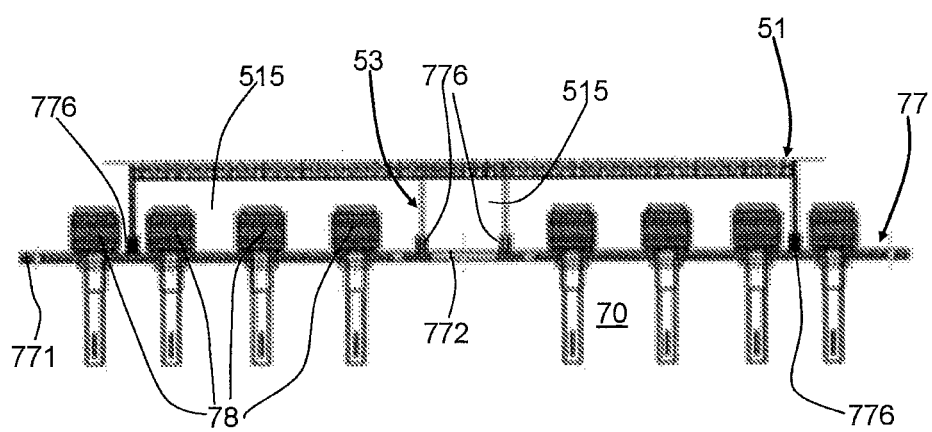
FIG. 20 shows a side view of a detail on the bottom of the central part of FIG. 10.

See FIG. 20, where the annular seats 776 are shown for the second plate 77; for the first plate 37 the annular seats 376 are made mirroring the second plate 77, see FIGS. 5 and 6.

Appropriate seals may be positioned in the annular seats 376, 776. The porous walls 51, 53 are therefore mounted snap-on and with a hydraulic seal between the plates 37, 77.

Figures 13, 14:
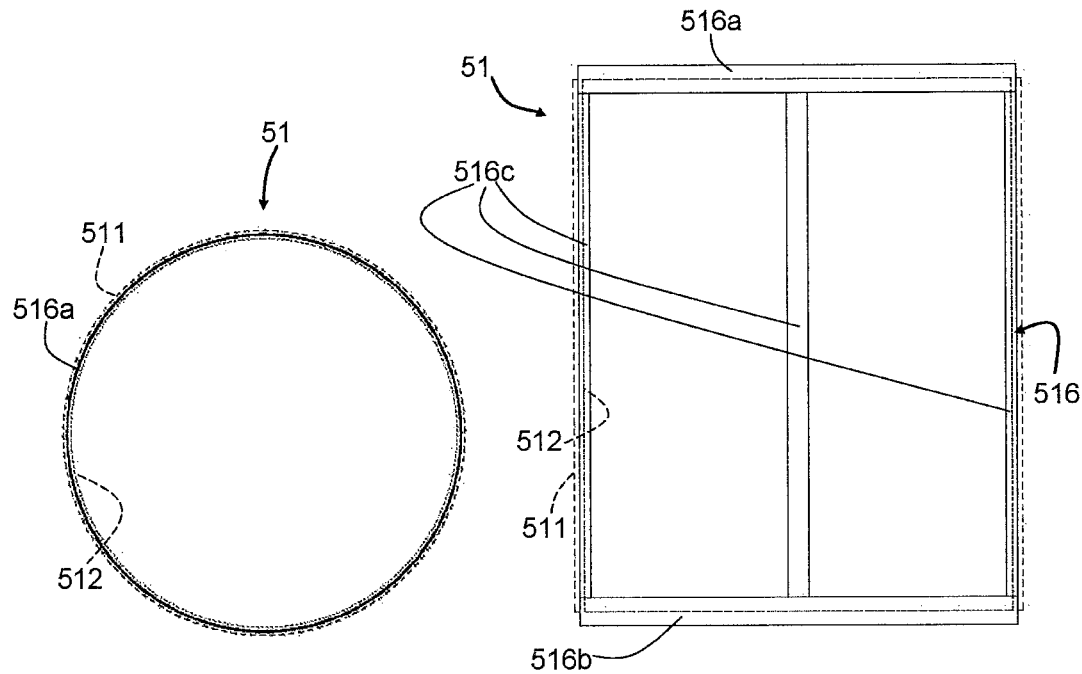
FIGS. 13 and 14 show a top view and a side view of a support for the component of FIG. 12 in a different embodiment.

In a different embodiment, each porous wall 51, 53 further comprises a support which maintains its tubular shape. FIGS. 13 and 14 show a support 516 for the outer porous wall 51. The support comprises an upper ring 516a, a lower ring 516b and a plurality of longitudinal rods 516c which connect the rings 516a, 516b together, leaving large transition openings between the longitudinal rods 516c. The support 516 is essentially a rigid cylindrical cage and is made, for example, of stainless steel. The rings 516a, 516b are intended to be received in the respective annular seats 376, 776; for example, they have a 50 mm height.

A layer 513 of filter mesh (not shown in FIGS. 13 and 14) is fitted around the support 516, resting on the longitudinal rods 516c.

A first layer 511 of perforated sheet surrounds from outside the filter mesh layer 513, while a second layer 512 of perforated sheet is positioned inside the support 516, against the longitudinal rods 516c. The filter mesh layer 513 is enclosed between the perforated sheet layers 511, 512; the second perforated sheet layer 512 protects the filter mesh layer 513. For example, the perforated plate and the filter mesh have the same characteristics as mentioned above for the first embodiment.

The inner porous wall 53 can be made the same way as the outer porous wall 51, with a support having the same structure as the support 516.

Figures 15, 16, 17, 18:
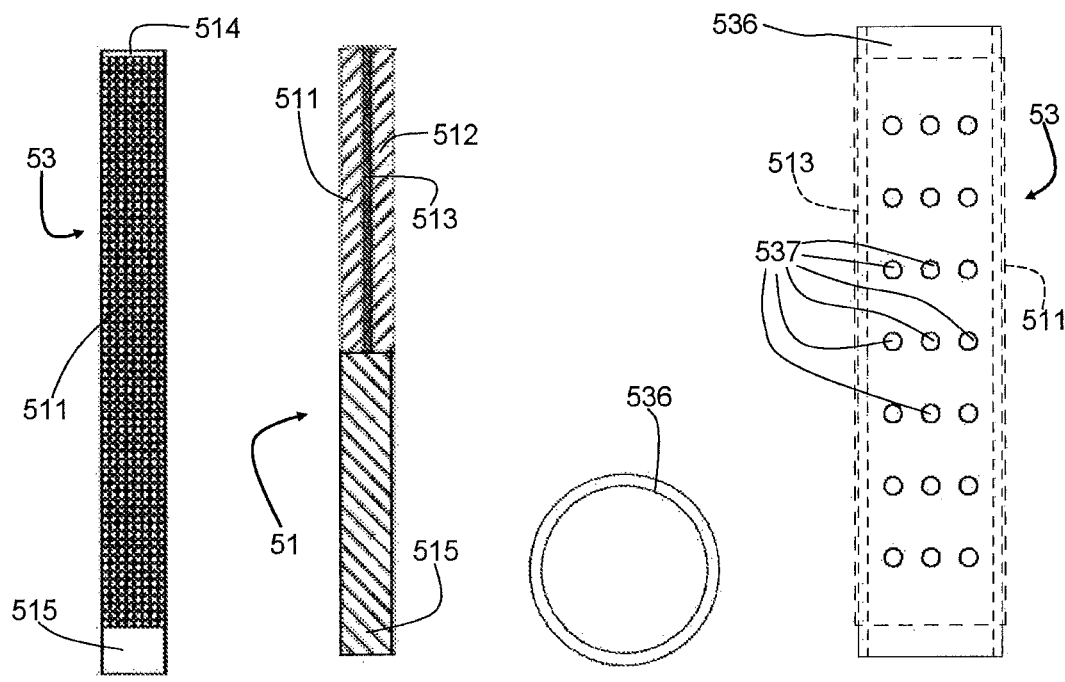
FIG. 15 shows a side view of another component of the central part of FIG. 10.
FIG. 16 shows an enlarged sectional view of a detail of the component of FIG. 12 or 15.
FIGS. 17 and 18 show a top view and a side view of a support for the component of FIG. 15 in a different embodiment.
Figure 19:
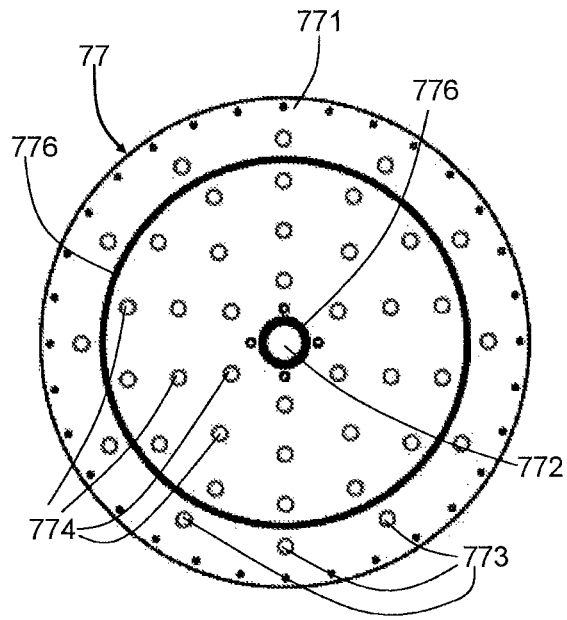
FIG. 19 shows a top view of a further component of the central part of FIG. 10.

Alternatively, as shown in FIGS. 17 and 18, the support 536 for the inner porous wall 53 is a tube (for example made of stainless steel), which surface has a plurality of through holes 537. The support tube 536 is covered from outside by a filter mesh layer 513, covered in turn from outside by a perforated sheet layer 511. For example, the perforated plate and the filter mesh have the same characteristics as mentioned above for the first embodiment. Essentially, the support tube 536 with the holes 537 also carries out the function which is carried out by the second perforated sheet layer 512 in the first embodiment. The embodiment with support tube 536 is particularly suitable for treatment equipment 1 wherein the inner porous wall 53 has a diameter of less than 150 mm.

The second plate 77 has a perimetral edge 771 which is fixed between the flange joints connecting the central body 15 and the bottom 17 of the container 11.

The second plate 77, which in particular is a circular shaped sheet, has a central through hole 772 which is at the inner chamber 54 enclosed by the inner porous wall 53. The second plate 77 supports the granular filter material 4 in the filtration chamber 40 and closes the bottom of the annular chamber 50.

The second plate 77 also has a plurality of through holes distributed on its surface to house nozzles 78: some holes 773 are outside the seat 776 for the outer porous wall 51 and house nozzles 78 which are positioned under the annular chamber 50; other holes 774 are in the interposed region between the seats 776 for the porous walls 51, 53 and house nozzles 78 which are positioned under the granular filter material 4. In particular, the nozzles 78 are distributed regularly on the second plate 77 and are approximately fifty per square meter. The nozzles 78, which are used for washing water feeding, are therefore arranged on the bottom of the filtration chamber 40 and on the bottom of the annular chamber 50.

In alternative embodiments, they could be arranged only on the bottom of the filtration chamber 40 and in this case the holes 773 would not be present.

Figure 21:
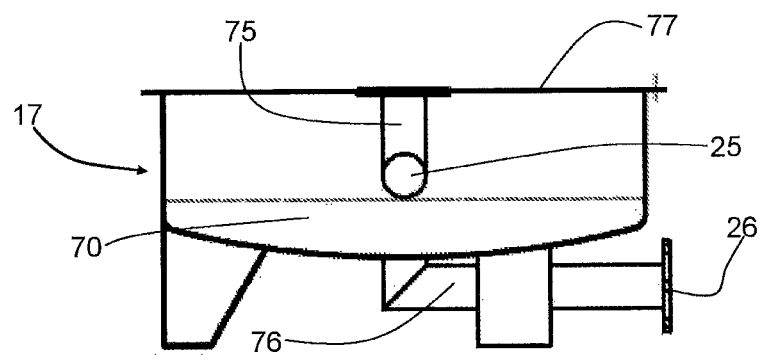
FIG. 21 shows a side view of a bottom part of the apparatus of FIG. 1, said bottom part being detached from the rest of the apparatus.
Figure 22:
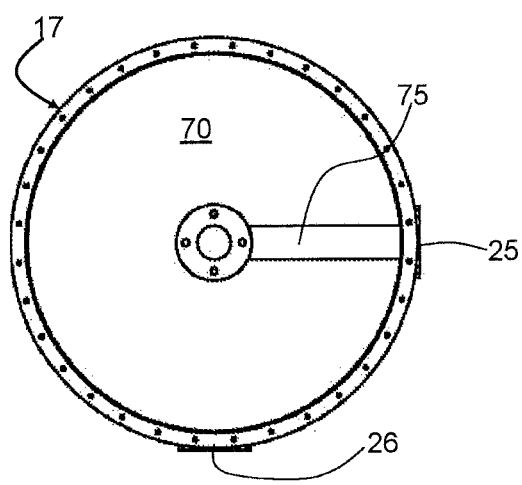
FIG. 22 shows a top view of the bottom part of FIG. 21.

The bottom 17 of the container 11, which is shown in greater detail in FIGS. 21 and 22, has a substantially cup shape. It is provided with an outlet 25 for the filtered water and an inlet 26 for the washing water.

The outlet 25 is connected to the central hole 772 of the second plate 77 by a tube 75 which, by means of a flange, is fixed to the second plate 77 itself.

The bottom 17 encloses an inner volume which forms a feeding chamber 70 for the washing water. The feeding chamber 70 has an opening on the bottom, through which it is connected to the inlet 26 by a tube 76; in an alternative embodiment, the opening connected to the inlet 26 is on the side wall of the feeding chamber 70 instead of on the bottom of the latter.

The feeding chamber 70 is delimited above by the second plate 77 and the nozzle inputs 78 face the feeding chamber 70.

For example, all the inner components of the filtering equipment 1 are made of stainless steel.

In an exemplary embodiment, the container 11 has a substantially cylindrical shape with a 1-meter diameter; the porous walls 51, 53 have a about 1-meter height; the outer porous wall 51 has a 0.8 meters diameter; the inner porous wall 53 has a 0.1 meters diameter; the filter mesh light of the porous walls 51, 53 is 100 microns. In an example of use, the filtration flow rate is between 10 and 350 $m^3/h$; the filtration flow speed is between 10 and 30 m/h; the load loss through the apparatus 1 is 120 mbar.

FIG. 23 shows the filtering apparatus 1 connected to the respective hydraulic circuits. In FIG. 23 are further shown a centrifugal pump 85, a first level probe 861 (which detects the water level in the annular chamber 50 to prevent dry running of the centrifugal pump 85), a second level probe 862 (which measures when the inner volume of the apparatus 1 is filled with water, to start the centrifugal pump 85), and a blower 87 to blow up air during the washing step.

The inlets 22 are connected to respective water supply ducts 812 to be filtered, provided with respective shut-off valves; the outlet 25 is connected to a filtered water discharge duct 815. The discharge duct 815 comprises a shut-off valve 825 and is connected to the suction of the pump 85. The suction of the pump 85 is also connected to a second branch 817 provided with a shut-off valve 827 and connected to a purified water accumulation of (not shown).

The centrifugal pump 85 has the delivery side which is connected to a duct having a first branch 831 for the filtered water discharge (provided with a shut-off valve 841), and a second branch 832 (also provided with a shut-off valve 842) connected to the washing circuit. In the illustrated embodiment, on the second branch 832 there is a first injector 881 with metering pump, for dosing sanitizing chemicals, and a second injector 882 with metering pump, for metering microorganisms intended to colonize the granular filter material 4 in the filtration chamber 40.

The washing circuit comprises: a first branch 835, provided with a shut-off valve 846, which connects the washing water inlet 26 to the second branch 832 from the centrifugal pump 85 and which is also connected to the blower 87; a second branch 836 which is connected to the washing water outlet 23, 24 (with respective shut-off valves 843, 844 interposition) and to the second branch 836 from the centrifugal pump 85 (with shut-off valve 845 interposition); a third branch 837, with respective shut-off valve 847, which is connected to the second branch 836.

The overflow door 28 is connected to an overflow discharge duct 818, also provided with a shut-off valve.

Before proceeding to the description of the operation of the apparatus 1, a more general point of view on the object of the present invention is meant to be provided.

The annular chamber 50 is a first chamber which communicates with the inlet 22 so as to receive water to be filtered. In the specific embodiment illustrated, the still basin 31 is interposed between the inlet 22 and the first chamber 50: the still basin 31 receives the water to be filtered from the inlet 22 and the first chamber 50 receives the water to be filtered which overflow from the calm tank 31. The first chamber 50 has a receiving region of water to be filtered which is at a first height H1, at the top of the first chamber 50 itself. The receiving region at the first height H1 corresponds, essentially, to the first transition openings 378 in the first plate 37.

The inner chamber 54 is a second chamber which communicates with the outlet 25 and is intended to receive filtered water and to discharge it towards the outlet 25 itself. The second chamber 54 has a discharge region of filtered water which is at a second height H2 at the bottom of the second chamber 54. The discharge region at the second height H2 corresponds, essentially, to the central hole 772 in the second plate 77.

The outer porous wall 51 is a first porous wall which divides the first chamber 50 from the filtration chamber 40. The inner porous wall 53 is a second porous wall which divides the second chamber 54 from the filtration chamber 40. The filtration chamber 40, therefore, is delimited between the first porous wall 51 and the second porous wall 53 and is interposed between the first chamber 50 and the second chamber 54.

The first height H1 is at a higher altitude than the second height H2. Moreover, the first chamber 50, the filtration chamber 40 and the second chamber 54 are laterally flanked to each other, so that in a section between the first height H1 and the second height H2 they are all intersected by a plurality of horizontal planes P, parallel to each other (see FIG. 2). The rooms communicate with each other through the porous walls 51, 53.

Figure 2:
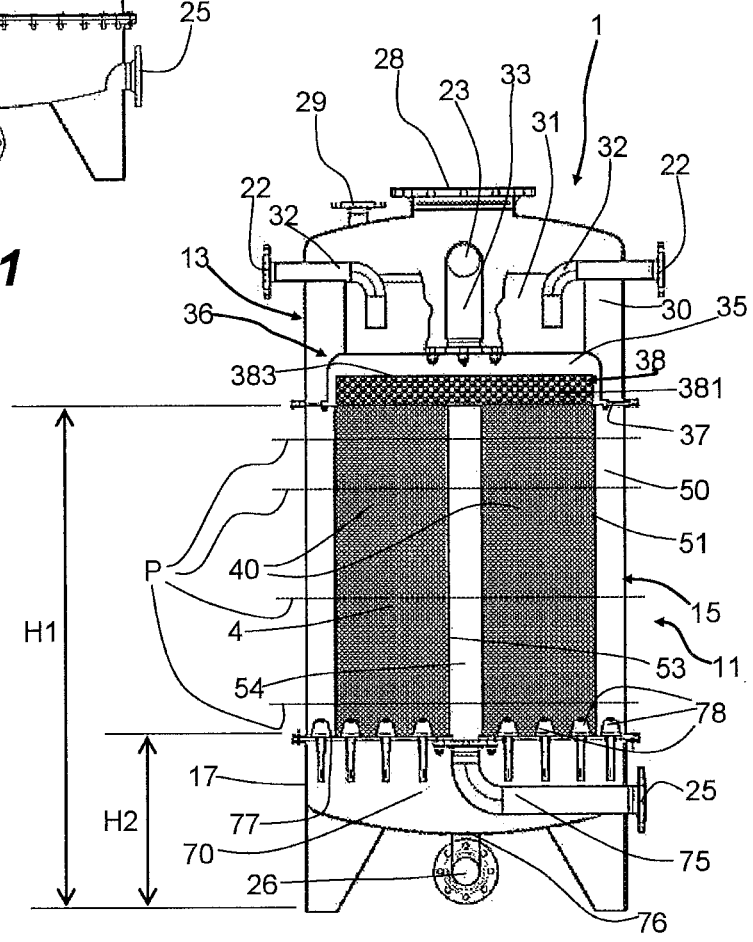
FIG. 2 shows a first side sectional view of the apparatus of FIG. 1.
Figure 10:
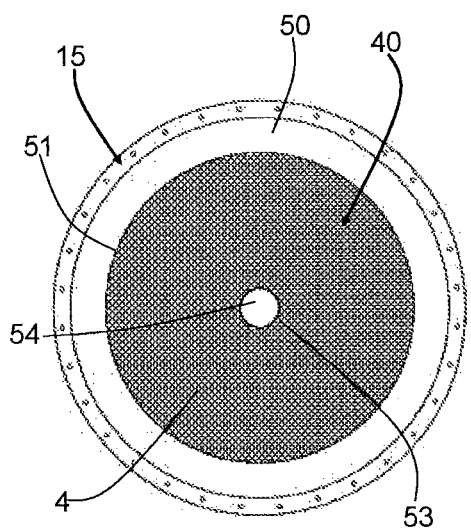
FIG. 10 shows a top view of a central part of the apparatus of FIG. 1, said central part being detached from the rest of the apparatus.
Figure 11:
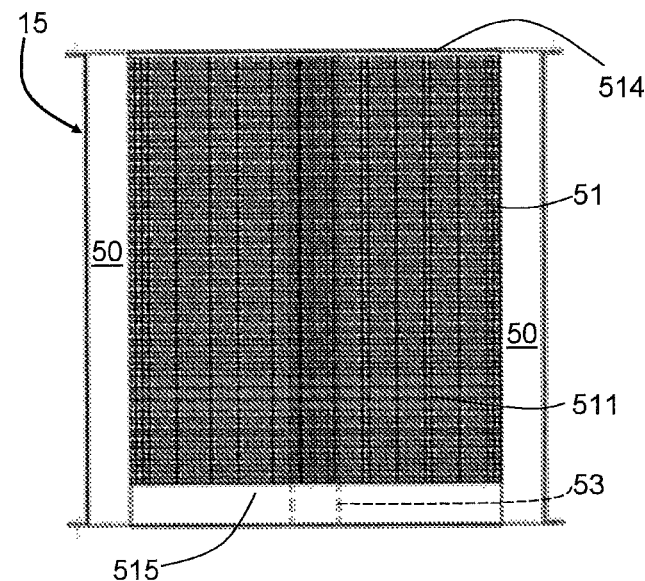
FIG. 11 shows an inner view of the central part of FIG. 10.

As can be seen in FIG. 2, each horizontal plane P intersects the first chamber 50, the filtration chamber 40 and the second chamber 54; furthermore, each horizontal plane P intersects the first porous wall 51 and the second porous wall 53.

Therefore, since the water to be filtered enters the first chamber 50 at a height H1 which is higher than the height H2 at which the filtered water exits from the second chamber 54, the water to be filtered passes from the first chamber 50 to the second chamber 54 (through the filtration chamber 40) substantially by gravity. Since the chambers are laterally flanked, the filtration chamber 40 and the granular filter material 4 therein are crossed by the water to be filtered with a flow path having a horizontal component.

In particular, the filtering chamber 40 has an annular shape (specifically, a cylindrical ring), the first chamber 50 has an annular shape (specifically, a cylindrical ring also) which surrounds the filtration chamber 40 from outside, the second chamber 54 has a tubular shape (specifically, a cylindrical tube) which is surrounded by the filtration chamber 40.

The flow path of the water to be filtered through the filtration chamber 40 is therefore substantially radial compared to the second chamber, as shown in FIGS. 24 and 25. In practice, the filter bed has a "height" which corresponds to the radial distance R4 between the two porous walls 51, 53, while the filtering surface extension corresponds to the surface of the first porous wall 51.

In alternative embodiments, although presumably less effective, the first chamber and the second chamber could be reversed, i.e. the chamber for the water to be filtered could be in the centre of the filtration chamber and the chamber for the filtered water could be outside the filtration chamber, with a radial path towards the outside. In other alternative embodiments, the chambers shape may be different and possibly non-cylindrical and/or non-annular, while maintaining the flow path with a horizontal component.

With regard to the filter mesh layer 513, possibly the second porous wall 53 may be without or have a different layer thereof, except the function of preventing granular material transition 4 in the second chamber 54.

The apparatus 1 comprises a washing system which includes, among other things, the ducts 832, 835, 836, 837, the respective valves, the tubes 76, 33, the feeding chamber 70, the nozzles 78. The washing system is used to wash the granular filter material 4 in the filtration chamber 40 and is configured to force a washing water flow which travels through the filtration chamber 40 with a substantially vertical path. By means of the washing system, the regeneration of the filter bed takes place.

In particular, in the configuration shown in the figures, the washing water flow is from bottom up. Furthermore, by means of the nozzles 78 at the bottom of the first chamber 50, the washing system is further configured to force a washing water flow into the first chamber 50 with a path that laps the first porous wall 51, also in this case with a substantially vertical upward path. The granular filter material 4 washing in the filtration chamber 40 and the washing of the first porous wall 51 in the first chamber 50 take place simultaneously.

The pump 85 is connected to the washing system and, depending on the state of the shut-off valves 825, 827, 841, 842, is alternatively used during the filtration step to discharge the filtered water from the outlet 25 and during the washing step to force the washing water flow into the filtration chamber 40, as well as in the first chamber 50.

The filtering apparatus 1 operation during the filtration operation is shown schematically in FIGS. 24 and 25. The water to be filtered enters the container 11 through the ducts 812 and the inlets 22, by gravity or pressure. The respective tubes 32 discharge the water into the still basin 31, in which the water loses speed and pressure. By overflow from the upper edge of the still basin 31, the water descends in the upper annular chamber 30 and from there, through the first transition openings 378, into the underlying annular chamber 50. When the level detected by the second level probe 862 is sufficient, the centrifugal pump 85 is driven. Valves 825 and 841 are closed, while valves 827 and 842 are opened.

Water passes through the outer porous wall 51. The filter mesh layer 513 carries out a first filtration action, retaining the impurities (in particular the organic material) which is larger than the transition light of the filter mesh itself. In other words, the filter mesh layer 513 acts as a pre-filter and retains the larger impurities, preventing them from reaching the granular filter material 4 in the filtration chamber 40.

The water passes through the granular filter material 4 in the filtration chamber 40 with a flow path which is substantially radial and with a horizontal component. The granular filter material 4 retains the smallest impurities, which progressively accumulate in the spaces between the granules. The filtered water, passing through the inner porous wall 53, is collected in the inner chamber 54, from which it exits through the central hole 772, descending in the tube 75 and from there to the outlet 25. Through the duct 825, the filtered water is sucked up by the centrifugal pump 85 and fed into the first branch 831 which supplies it to the respective user. The centrifugal pump 85 can "help" the gravity force to pass water through the filtration chamber 40.

Periodically a washing step is necessary to remove the impurities accumulated during the filtration step from the filtering apparatus 1, thus regenerating the filter bed and preparing it for a new filtration step. The washing step is shown schematically in FIGS. 26 and 27.

The supply of water to be filtered and the discharge of filtered water are interrupted by closing the respective valves on the ducts 812 and the valve 825. Valves 827 and 842 are opened, valve 841 is closed. The pump 85, through the branch 817, takes washing water from the purified water accumulation and sends it under pressure to the washing circuit through the second branch 832. The valve 845 is closed, therefore the washing water is sent to the inlet 26 through the first branch 835.

Through the inlet 26 and the tube 76, pressurized washing water is fed to the feeding chamber 70 on the bottom of the container 1. From the feeding chamber 70 and through the respective nozzles, the washing water enters under pressure both in the filtration chamber 40 containing the granular material 4 and in the annular chamber 50.

Blower 87 can be driven to feed air which increases the thrust on the filter bed during washing. Furthermore, by means of the first injector 881 it is possible to inject sanitizing chemicals that facilitate the removal of the organic substance retained during filtration.

In the annular chamber 50, the washing water rises lapping the outer porous wall 51 and removing from it what retained by the filter mesh layer 513. Once reached the upper annular chamber 30 after passing through the first transition openings 378, the dirty washing water exits from the second outlet 24.

In the filtration chamber 40, the washing water rises through the granular material bed 4, shaking it and releasing the retained impurities, which are dragged upwardly by the washing water flow. After passing through the second transition openings 379, the dirty washing water passes through the retaining element 38, which retains the filter material grains possibly dragged, collects in the collection chamber 35 and exits from the first outlet 23 through the tube 33.

Through the second branch 836 of the washing circuit, the dirty washing waters are conveyed in the third branch 837 and through it they are sent to a discharge or a treatment, for example to a sewerage circuit for their disposal or to a basin wherein the organic substance is separated.

In one embodiment, the granular material filter bed 4 can be activated with microorganisms suitable for the type of fluid to be treated: the microorganisms colonize the filter bed and produce a biofilm which cooperates in the purification of the water to be treated.

To activate the biofilm, the inner volume of the container 11 is filled with water until the still basin is filled up 31. In particular, the water used for the biofilm activation step has an acidic pH, between 3 and 6.5.

The second level probe 862 drives the centrifugal pump 85, through which the water is circulated inside the apparatus 1: the pump 85 withdraws the water from the outlet 25 by means of the duct 815 and sends it in the second branch 832, from which it is again fed into the apparatus 1 by means of the second branch 836 of the washing circuit and the first outlet 23 for the washing water. In this procedure, valves 825, 842, 845, 843 are open, while valves 827, 841, 846, 847, 844 are closed. In this configuration, the water passes through the granular material 4 of the filter bed.

Through the second injector 882, the microorganisms are supplied to the circulating water. The pump 85 continues to circulate the water inside the filter bed and the microorganisms are deposited in the granular material 4, colonizing the filter bed and generating the biofilm. At the end of the biofilm activation, the apparatus is brought back in the filtration configuration. Biofilm activation should be repeated after each washing which using sanitizing chemicals.

Alternatively, or in addition to the microorganisms which produce the purifying biofilm, by means of the second injector 882 can also be fed useful microorganisms which, by colonizing the filter bed, can for example give the water active ingredients of the mother yeast or substances to slow down musts fermentation.

It is noted that the same pump 85 is used for filtered water discharge during filtration and for feeding washing water during the washing step. This is advantageous because the need for an additional pump only for washing is avoided.

An example of the purification results achievable with a filtering apparatus 1 according to the present invention are shown in the following: turbidity reduction (as $SiO_2$) up to values lower than 1 mg/l; organic matter reduction between 60% and 65%; heavy metals reduction between 50% and 99%; perfluorinated alkyl compounds (known as PFAS) reduction between 70% and 99%; 100% viable microorganisms charge reduction at 22° C.; 100% viable microorganisms charge reduction at 36° C.; 100% viruses reduction.

Such conceived invention is susceptible of numerous modifications and variations, all of which falling within the protective scope of the appended claims.

All the details can be replaced by other technically equivalent ones and the materials used, as well as the shapes and the sizes of the various components, may be of any type according to the requirements.

The invention claimed is:

1. A filtering apparatus for filtering liquids comprising
   a container having an inlet for the liquid to be filtered and an outlet for the filtered liquid;
   a first chamber, inside the container, which communicates with said inlet and is intended to receive liquid to be filtered from said inlet;
   a still basin interposed between the inlet for the liquid to be filtered and the first chamber, wherein the still basin is intended to receive the liquid to be filtered from said inlet and the first chamber is intended to receive the liquid to be filtered which overflows from the still basin;
   a second chamber, inside the container, which communicates with said outlet and is intended to receive filtered liquid and discharge it towards said outlet;
   a first porous wall and a second porous wall which are positioned inside the container and delimit a filtration chamber between them, wherein the first porous wall divides the first chamber from the filtration chamber and wherein the second porous wall divides the second chamber from the filtration chamber, the filtration chamber being interposed between the first chamber and the second chamber;

a granular filter material which is housed in the filtration chamber, the granular filter material being enclosed between the first porous wall and the second porous wall; wherein the first chamber has a receiving region of liquid to be filtered which is at a first height and wherein the second chamber has a discharge region of filtered liquid which is at a second height, the first height being at a higher altitude than the second height;

wherein the first chamber, the filtration chamber and the second chamber are flanked to each other and, in a section between the first height and the second height, are all intersected by a plurality of horizontal planes parallel to each other, whereby in use the liquid to be filtered passes from the first chamber to the second chamber substantially by gravity and through the filtration chamber with a flow path having a horizontal component.

2. The filtering apparatus according to claim 1, wherein the filtration chamber has an annular shape, wherein the first porous wall between the first chamber and the second chamber has an annular shape which surrounds the filtration chamber from the outside, and the second porous wall between the first chamber and the second chamber has a tubular shape which is surrounded by the filtration chamber, wherein the flow path from the first chamber to the second chamber is substantially radial compared to the tubular shaped chamber.

3. The filtering apparatus according to claim 2, wherein the first chamber surrounds the filtration chamber from the outside and the second chamber is surrounded by the filtration chamber.

4. The filtering apparatus according to claim 1, to which the liquid receiving region at the first height is at the top of the first chamber and wherein the liquid discharge region at the second height is at the bottom of the second chamber.

5. A filtering apparatus for filtering liquids comprising
a container having an inlet for the liquid to be filtered and an outlet for the filtered liquid;
a first chamber, inside the container, which communicates with said inlet and is intended to receive liquid to be filtered from said inlet;
a second chamber, inside the container, which communicates with said outlet and is intended to receive filtered liquid and discharge it towards said outlet;
a first porous wall and a second porous wall which are positioned inside the container and delimit a filtration chamber between them, wherein the first porous wall divides the first chamber from the filtration chamber and wherein the second porous wall divides the second chamber from the filtration chamber, the filtration chamber being interposed between the first chamber and the second chamber;
a granular filter material which is housed in the filtration chamber, the granular filter material being enclosed between the first porous wall and the second porous wall; wherein the first chamber has a receiving region of liquid to be filtered which is at a first height and wherein the second chamber has a discharge region of filtered liquid which is at a second height, the first height being at a higher altitude than the second height;
a washing system to wash the granular filter material, the washing system being configured to force a washing liquid flow which travels through the filtration chamber with a substantially vertical path;
a pump connected to the outlet for the filtered liquid and to the washing system, the filtration apparatus comprising ducts and shut-off valves configured in such a way that, during the filtration step, the pump can be used to discharge the filtered liquid from the outlet and, during washing, the pump can be used to force the washing liquid flow in the filtration chamber and in the first chamber;
wherein the first chamber, the filtration chamber and the second chamber are flanked to each other and, in a section between the first height and the second height, are all intersected by a plurality of horizontal planes parallel to each other, and
whereby in use the liquid to be filtered passes from the first chamber to the second chamber substantially by gravity and through the filtration chamber with a flow path having a horizontal component.

6. The filtering apparatus according to claim 5, wherein the washing system is further configured to force a washing liquid flow in the first chamber with a path which laps the first porous wall.

7. The filtering apparatus according to claim 5, wherein the washing system comprises a plurality of liquid feeding nozzles which are arranged on the bottom of the filtration chamber and on the bottom of the first chamber.

8. The filtering apparatus according to claim 5, comprising a collection chamber for the washing liquid which has travelled through the filtration chamber, the collection chamber being connected to an outlet for the washing liquid by means of a tube.

9. The filtering apparatus according to claim 1, wherein the first porous wall comprises a filter mesh layer, the first porous wall being intended to act as a pre-filter to retain at least a part of the impurities dragged by the liquid to be filtered upstream of the filtration chamber.

10. The filtering apparatus according to claim 1, further comprising at least one injector to dose microorganisms intended to colonize the granular filter material.

\* \* \* \* \*